(12) United States Patent
Chow

(10) Patent No.: US 8,205,609 B2
(45) Date of Patent: Jun. 26, 2012

(54) SOLAR HEAT ABSORBING WINDOW

(75) Inventor: Tin Tai Chow, Kowloon (HK)

(73) Assignee: City University of Hong Kong, Kowloon (HK)

( * ) Notice: Subject to any disclaimer, the term of this patent is extended or adjusted under 35 U.S.C. 154(b) by 330 days.

(21) Appl. No.: 12/468,950

(22) Filed: May 20, 2009

(65) Prior Publication Data

US 2010/0294260 A1      Nov. 25, 2010

(51) Int. Cl.
*F24J 2/30* (2006.01)
*E04D 13/18* (2006.01)
*F25D 23/12* (2006.01)

(52) U.S. Cl. .......... 126/643; 126/633; 52/173.3; 62/262

(58) Field of Classification Search .................. 126/633, 126/643; 52/173.3; 62/262
See application file for complete search history.

(56) References Cited

U.S. PATENT DOCUMENTS

| | | | | |
|---|---|---|---|---|
| 3,761,165 A * | 9/1973 | Besnard | ........................ | 359/886 |
| 4,003,367 A * | 1/1977 | Wikholm | ..................... | 126/639 |
| 4,090,497 A * | 5/1978 | Kelly | ............................ | 126/643 |
| 4,644,934 A * | 2/1987 | Kaus | ............................ | 126/640 |

FOREIGN PATENT DOCUMENTS

GB         2 450 474 A      12/2008
WO     WO 2008075286 A2 *  6/2008

* cited by examiner

*Primary Examiner* — Kenneth Rinehart
*Assistant Examiner* — William Corboy
(74) *Attorney, Agent, or Firm* — Leydig, Voit & Mayer, Ltd.

(57) ABSTRACT

A window with an integral solar heat-absorber is provided in a compact, low-cost package. Two transparent panes are separated from one another to provide a first passageway for receiving a working fluid. The periphery of the panes is secured in a frame in which a heat exchanger is also secured, the heat exchanger having a second passageway for the working fluid and a third passageway for a service fluid. The first and second passageways are coupled to make a working fluid circuit.

10 Claims, 2 Drawing Sheets

SOLAR HEAT ABSORBING WINDOW

TECHNICAL FIELD

The present invention relates to a window having an integral solar heat collector.

BACKGROUND OF THE INVENTION

Windows may incorporate a transparent solar collector and thereby offer a more pleasing architectural aesthetic than opaque solar heat collectors. These windows typically include two glass sheets between which either air or a liquid is received—the latter being described in GB2450474. A problem experienced with these liquid-circulating transparent collectors has been the necessity for connecting the window to a remote heat exchanger in which the energy-absorbing fluid piped from the collector transfers heat energy to some other fluid for utilisation. This has involved an undesirably large amount of plumbing, pump and pipe fittings, together with the additional volume of heat absorbing fluid required to fill such plumbing, as well as the labour and materials in the piping and assembly thereof. It also has involved excessive opportunity for leakage, property damage and loss of comparatively expensive energy-absorbing working fluid, say when a transparent pane is broken. It is an object of the present invention to overcome or substantially ameliorate the above disadvantages or more generally to provide an improved heat absorbing window.

DISCLOSURE OF THE INVENTION

According to one aspect of the present invention there is provided a heat-absorbing window assembly comprising:
first and second transparent panes separated from one another to provide a first passageway therebetween for receiving a working fluid;
a frame in which a periphery of the panes is secured;
a heat exchanger secured in the frame, the heat exchanger having a second passageway therein for the working fluid and a third passageway therein for a service fluid;
and conduit means coupling the first and second passageways to make a working fluid circuit in the frame by which heat energy absorbed by the working fluid in the first passageway is supplied to the heat exchanger.

Preferably the frame includes elongate upper and lower members in which opposing upper and lower ends of the first passageway are received, and the second and third passageways extend longitudinally within the upper member.

Preferably inlet and outlet ports proximate opposing ends of the third passageway extend through openings in the frame proximate opposing ends of the upper member.

Preferably the conduit means comprise upper and lower headers extending adjacent upper and lower ends of the first passageway respectively, longitudinally spaced openings in the upper and lower headers providing fluid communication between each header and its respective end of the first passageway, and a first and second conduit connecting the second passageway to the upper and lower headers respectively.

Preferably the window further comprises a tank within the frame for providing an expansion space. Preferably the tank is mounted in the upper member and connected to the first conduit.

Preferably the second and third passageways are coaxial, most preferably the third passageway is annular in cross section and surrounds the second passageway.

Preferably the third passageway is provided in a tubular member surrounded by thermal insulation and received within the upper frame member.

Preferably the service fluid flows through the third passageway in a direction opposite the flow of the working fluid through the second passageway.

This invention provides a heat-absorbing window assembly which is effective and efficient in operational use, and which may be economically constructed. The heat-absorbing window has a compact working circuit all located within the window frame, which minimizes the amount of working fluid in the system. This also reduces the flow friction and heat losses in the circuit, and results in better heat transfer characteristics. Pumping energy is eliminated in the recirculating liquid flow, which is self regulated as the higher buoyant force induces higher flow resistance.

BRIEF DESCRIPTION OF THE DRAWINGS

Preferred forms of the present invention will now be described by way of example with reference to the accompanying drawings, wherein.

DESCRIPTION OF THE PREFERRED EMBODIMENTS

Figure 1:
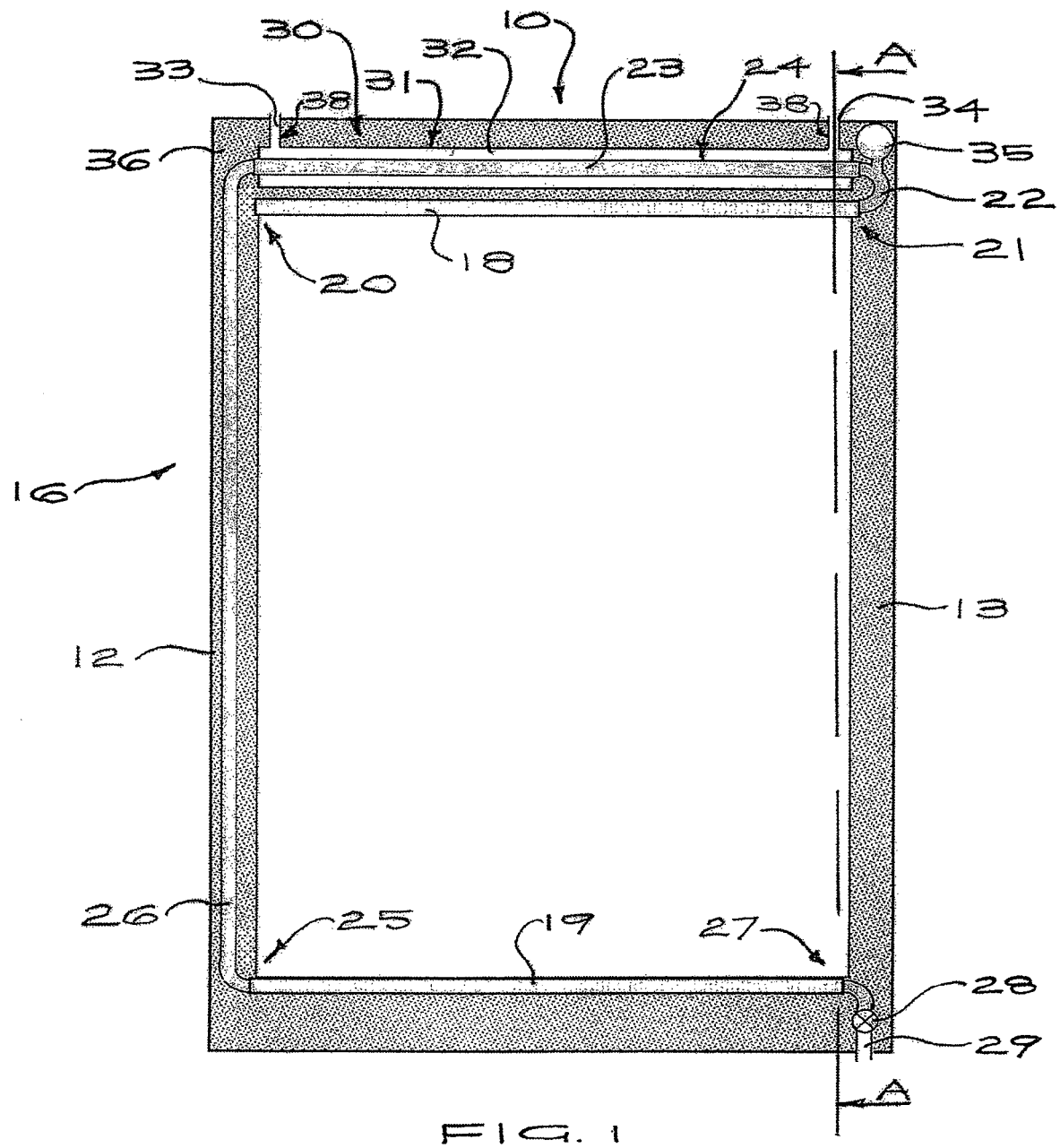
FIG. 1 is a schematic front sectional view of a heat absorbing window according to an exemplary embodiment of the invention.
Figure 2:
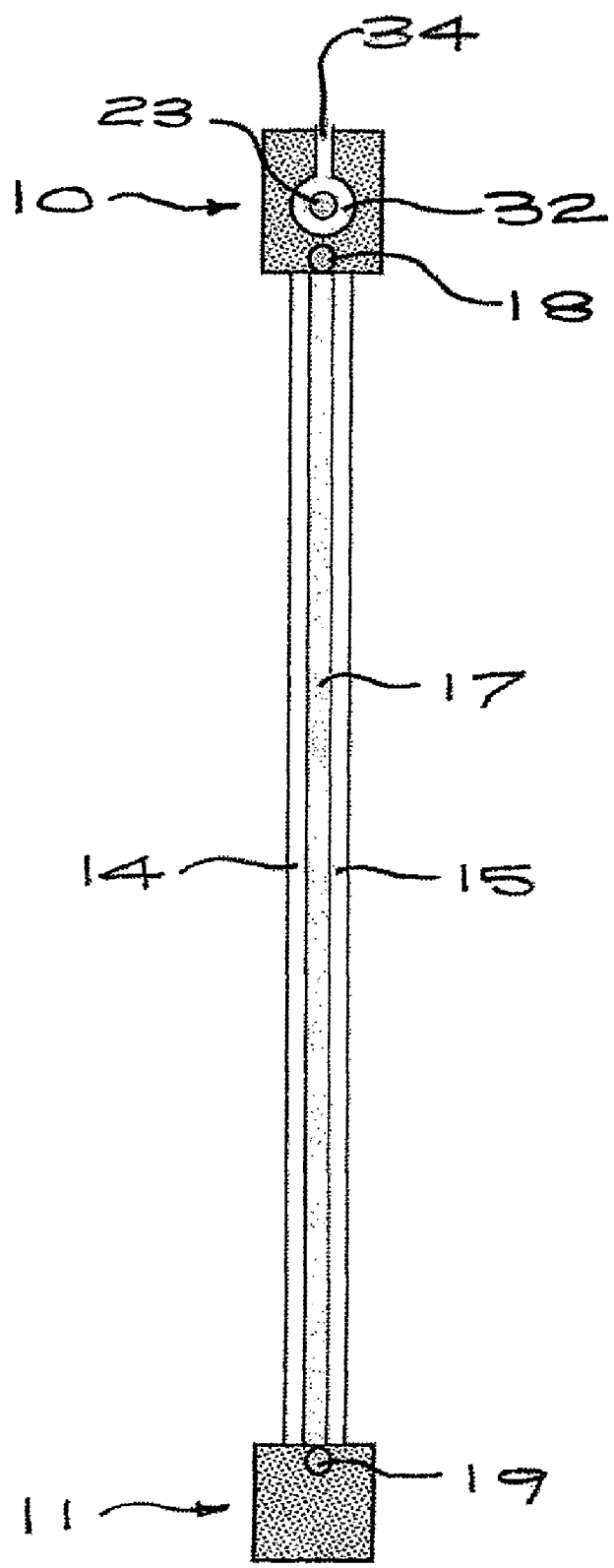
FIG. 2 is a schematic section along line AA of FIG. 1.

A heat-absorbing window includes elongate upper and lower members 10, 11 and side members 12, 13 formed of metal or a rigid polymer. The members 10-13 are hollow, having an elongate open mouth in which the edges of first and second panes 14, 15 of transparent glass or polymer are received. The members 10-14 are connected by joints (not shown) at their ends to form a rectangular window frame 16. In use the frame 16 is fastened in an architectural opening and may be fixed in position, or optionally it may be mounted by hinges or rails for pivoting or sliding movement. The frame is mounted upright in the orientation shown in the drawings, but may be inclined upwardly as when mounted in a pitched roof to provide a skylight, or when a hinged window is opened.

The first and second panes 14, 15 are flat, rectangular and parallel, being spaced apart to define a first passageway 17 therebetween. The long edges of the panes 14, 15 received in the side members 12, 13 are sealed closed, while the short edges are connected to upper and lower distribution headers 18, 19. To improve the heat absorption of the working fluid, the surface of the inner transparent pane 14 (the pane that bounds the indoor space) can be applied with a layer of reflective film (not shown), subjecting the first passageway 17 to a reflected radiation on its path back to the ambient environment. This reflective layer also advantageously also reduces the space heat gain within the building. To extend the functionality of the window, the outer transparent pane 15 can be a photovoltaic glazing of which the solar cells (not shown) can be cooled by the fluid flow in the first passageway 17, and the electricity generated is used to support other building activities.

The headers 18, 19 are received in the upper and lower members 10, 11 respectively and comprise like tubular members with longitudinally spaced openings in their walls that communicate with upper and lower edges of the first passageway 17. The end 20 of the upper header 18 is closed, and the opposing end 21 is connected by a conduit 22 to a second passageway 23 formed in a copper tube 24. The end 25 of the lower header 19 is connected by a conduit 26 to the second passageway 23, while the opposing end 27 is connected via a shut-off valve 28 to a charging and discharging port 29. For draining, the lower header 19 slopes towards the end 27. The patterns of openings in the headers 18, 19 for connection to the first passageway 17 are arranged to produce a uniform upward flow of fluid across the full width of the first passage 17. The cross-section of the distribution headers 18, 19 may alternatively be rectangular, or may vary in shape or size along its length.

The copper tube 24 and the second passageway 23 defined by it form part of a narrow elongate heat exchanger 30 mounted in the upper member 10, which also includes an outer tube 31 coaxial with the tube 24 to define a third passageway 32 which is annular in cross section. The third passageway 32 is substantially coextensive with the second passageway 23 and includes inlet and outlet ports 33, 34 proximate opposing ends of the third passageway 32 that extend through openings in the frame proximate opposing ends of the upper member 10. The heat exchanger 30 is fixed in the upper frame member 10 by means of pipe fittings 38 fixed at opposing ends of the hollow member or outer tube 31 and extending through respective apertures in the frame member 10. The fittings 38 thus serve both to mechanically mount the heat exchanger 30 and to provide a fluid connection to the inlet and outlet ports 33, 34. In alternative embodiments (not shown) one or other of the tubes 24, 31 may be integral with the upper frame member 10.

A tank 35 is mounted within the frame for providing an expansion space. As illustrated, the tank 35 is mounted in the upper member 10 and connected to the conduit 22. An air vent (not shown) is provided for venting air from the system. For air venting the heat exchanger 30 and upper header 18 are sloped upward toward the tank 35, the connection to the conduit 22 thereby being at the highest point in the circuit.

The window frame 16 is filled with thermal insulation material 36 such as polyurethane foam, surrounding the heat exchanger 30, the conduits 22, 26 and the periphery of the panes 14, 15.

The first passageway 17, headers 18, 19 and conduits 22, 26 are filled with a working fluid such as a transparent fluid such as water or alcohol, or a mixture of water and alcohol. Optionally the working fluid can be another pure or mixed transparent liquid, or semi-transparent (coloured) liquid to alter the optical properties, in particular the solar transmittance of the glazing in the visible range. Solar radiation absorption elevates the temperature of the working fluid, and induces a natural circulation flow as a result of the thermosyphon effect. Referring to FIG. 1, the working fluid flows in an anti-clockwise circuit up through the first passageway and through the heat exchanger 30, returning via the conduit 26 to the first passageway.

A service fluid, as for providing a hot water service in a building, is connected to flow between the inlet and outlet 33, 34 in counter-flow to the working fluid in the heat exchanger 30. In the case of a hinged window, the inlet and outlet 33, 34 are connected via two flexible hoses to the service fluid pipework inside the building structure. A plurality of heat-absorbing windows can be connected together by the service fluid pipework, either in parallel or, series, or a combination thereof, in order to maximize the heat collecting capacity. Additionally a phase-change-material can be applied at the flow channel 31 of the heat exchanger 30. This additional heat storage helps to stabilize the working temperature of the service fluid and thus further improve the overall heat exchange performance. When the working fluid has been drained out, the window air circulation through the first passageway provides a limited amount of heat exchange capability.

Aspects of the present invention have been described by way of example only and it should be appreciated that modifications and additions may be made thereto without departing from the scope thereof. For instance, a refrigerant could be used as the working fluid such that the first passageway 17 will behave as an evaporator and the heat exchanger will behave as a condenser. Alternatively, to enhance thermal comfort in winter a hot service fluid could be directed to the heat exchanger and a pump may be mounted to the frame for circulating the working fluid.

The invention claimed is:

1. A heat-absorbing window comprising:
   first and second transparent panes separated from one another to provide a first passageway between the first and second transparent panes for flow of a working fluid through the passageway;
   a frame in which peripheries of each of the first and second transparent panes are secured;
   a heat exchanger secured in an upper part of the frame, the heat exchanger including a second passageway for flow of the working fluid and a third passageway for flow of a service fluid; and
   conduit means coupling the first passageway to the second passageway to make a working fluid flow circuit in the frame through which heat energy absorbed by the working fluid in the first passageway is supplied to the heat exchanger and through which the working fluid exiting the second passageway of the heat exchanger is returned to a lower part of the first passageway, wherein the service fluid flows through the third passageway in a direction opposite flow of the working fluid through the second passageway.

2. A heat-absorbing window comprising:
   first and second transparent panes separated from one another to provide a first passageway between the first and second transparent panes for flow of a working fluid through the passageway;
   a frame in which peripheries of each of the first and second transparent panes are secured;
   a heat exchanger secured in an upper part of the frame, the heat exchanger including a second passageway for flow of the working fluid and a third passageway for flow of a service fluid; and
   conduit means coupling the first passageway to the second passageway to make a working fluid flow circuit in the frame through which heat energy absorbed by the working fluid in the first passageway is supplied to the heat exchanger and through which the working fluid exiting the second passageway of the heat exchanger is returned to a lower part of the first passageway, wherein the conduit means comprises
   upper and lower headers respectively extending adjacent upper and lower ends of the first passageway,
   longitudinally spaced openings in the upper and lower headers providing fluid communication between the upper and lower headers and respective upper and lower ends of the first passageway, and
   first and second conduits connecting the second passageway to the upper and lower headers, respectively.

3. The window of claim 2 wherein the lower header includes a shut-off valve for liquid filling and drainage.

4. The window of claim 2 wherein the window further comprises a tank within the frame for providing an expansion space, the tank including an air-venting device.

5. The window of claim 4 wherein the tank is mounted in the upper member and connected to the first conduit.

6. A heat-absorbing window comprising:
first and second transparent panes separated from one another to provide a first passageway between the first and second transparent panes for flow of a working fluid through the passageway;
a frame in which peripheries of each of the first and second transparent panes are secured;
a heat exchanger secured in an upper part of the frame, the heat exchanger including a second passageway for flow of the working fluid and a third passageway for flow of a service fluid; and
conduit means coupling the first passageway to the second passageway to make a working fluid flow circuit in the frame through which heat energy absorbed by the working fluid in the first passageway is supplied to the heat exchanger and through which the working fluid exiting the second passageway of the heat exchanger is returned to a lower part of the first passageway, wherein
the frame includes elongate upper and lower members in which upper and lower ends of the first passageway are received,
the second and third passageways extend longitudinally within the upper member, and
the second and third passageways are coaxial, the third passageway being annular in cross section and surrounding the second passageway.

7. The window of claim 6 wherein the third passageway is located in a tubular member surrounded by thermal insulation and received within the upper member.

8. A heat-absorbing window assembly comprising:
first and second transparent panes separated from one another to provide a first passageway between the first and second transparent panes for flow of a working fluid through the passageway;
a frame in which peripheries of each of the first and second transparent panes are secured, the frame including elongate upper and lower members in which upper and lower ends of the first passageway are received, each opposing end of the upper member including an opening;
a heat exchanger secured in an upper part of the frame, the heat exchanger including second and third passageways extending longitudinally within the upper member, the second passageway receiving a flow of the working fluid, and the third passageway including a hollow member extending around the second passageway and defining the third passageway as surrounding the second passageway;
first and second fittings respectively fixed at first and second ends of the hollow member, each fitting extending through a respective one of the openings in the upper member, mounting the heat exchanger, the fittings providing inlet and outlet ports for flow of a service fluid flowing through the third passageway, and
conduit means coupling the first passageway to the second passageway to make a working fluid flow circuit in the frame through which heat energy absorbed by the working fluid in the first passageway is supplied to the heat exchanger and through which the working fluid exiting the second passageway of the heat exchanger is returned to a lower part of the first passageway.

9. The window of claim 8 wherein the conduit means comprises
upper and lower headers respectively extending adjacent upper and lower ends of the first passageway,
longitudinally spaced openings in the upper and lower headers providing fluid communication between the upper and lower headers and respective upper and lower ends of the first passageway, and
first and second conduits connecting the second passageway to the upper and lower headers, respectively.

10. The window of claim 9 wherein the window further comprises
a tank mounted in the upper member and connected to the first conduit at a highest point in the working fluid circuit for providing an expansion space, and
a valve in communication with a lowest point of the working fluid circuit.

* * * * *